United States Patent [19]

Matsuura et al.

[11] 4,373,796
[45] Feb. 15, 1983

[54] FILM END DETECTOR FOR USE IN AUTOMATIC FILM WINDING CAMERA

[75] Inventors: Tsuyoshi Matsuura, Ina; Hiroshi Fujiwara, Kawasaki; Mamoru Aihara, Hachioji; Yutaka Takahashi, Hachioji; Yoshio Nakajima, Hachioji, all of Japan

[73] Assignee: Olympus Optical Company Ltd., Tokyo, Japan

[21] Appl. No.: 197,665

[22] Filed: Oct. 16, 1980

[30] Foreign Application Priority Data

Oct. 26, 1979 [JP] Japan .................... 54-147570[U]

[51] Int. Cl.³ .................... G03B 1/18; G03B 17/18
[52] U.S. Cl. .................... 354/173; 354/213; 354/217; 354/289
[58] Field of Search ........... 354/170, 171, 173, 206, 354/213, 217, 204, 218, 289; 352/170-172

[56] References Cited

U.S. PATENT DOCUMENTS 2,166,419  7/1939  O'Neill ................. 354/217 X
4,084,169  4/1978  Iwata et al. ............ 354/206 X

OTHER PUBLICATIONS

Japanese Laid-Open Patent Application Lay-Open No. P 53-108,424; Laid-Open Sep. 21, 1978; Application No. P 52-23,519; Filed Mar. 4, 1977; Inventor: Izumi Kanazawa et al; Applicant: Mamiya Koki Co., Ltd.

*Primary Examiner*—L. T. Hix
*Assistant Examiner*—William B. Perkey
*Attorney, Agent, or Firm*—Weinstein & Sutton

[57] ABSTRACT

A film end detector for use in automatic film winding camera comprises a rotary disc having a light transmitting area and mounted on the drive shaft of a motor which is used to wind up a film automatically. The rotation of the disc is monitored by a combination of a light source and light receiving, photoelectric transducer element which are disposed to monitor the passage of light through the light transmitting area, thus detecting a film end. Logic circuits examine the output of the photoelectric transducer element at predetermined intervals to ascertain the completion or failure of completion of a normal film-winding operation.

9 Claims, 5 Drawing Figures

FILM END DETECTOR FOR USE IN AUTOMATIC FILM WINDING CAMERA

BACKGROUND OF THE INVENTION

The invention relates to a film end detector for use in an automatic film winding camera.

A conventional automatic film winding camera includes a film end detector which is in the form of a rotary disc mounted on a drive shaft of a motor which is connected to a film winding mechanism, with a notch of a given width being formed in the disc to permit a mechanical arm to be engaged with or disengaged from the notch to operate a microswitch or the contacts of a reed relay, thus providing a film end detection by the closing or opening or off of the contacts. Specifically, when a film end is not reached, the drive shaft of the motor will rotate through one revolution to wind up a length of the film corresponding to one frame. In this instance, the contacts will cycle from their off condition through their on condition and then return to their off condition again. By contrast, when a film end is reached during the course of a winding operation, the drive shaft cannot rotate through one complete revolution, but ceases to rotate before the one revolution is completed. Consequently, the contacts are only switched from their off to their on condition, and remain on. The failure of the contacts to return to their off condition provides an indication that the film end is reached. However, an angular position detector of this type which is provided with mechanical contacts experiences difficulties in respect of durability. In addition, it disadvantageously requires an increased size.

A conventional film end detector of the type described may malfunction, though with a reduced probability, and a false indication may be given indicating that a length of the film remains even though the full length of the film has been actually exhausted. After investigation, it is found that such a malfunction is attributable to the fact that in the event the disc comes to a stop after the notch formed therein has slightly moved past the arm, the disc rotates in the opposite direction, though slightly, when the motor is deenergized, allowing the arm to engage the notch again. Such a malfunction precludes a normal photographing on the film, and causes an important opportunity to take pictures to be missed. This is of particular significance in taking pictures through a microscope.

SUMMARY OF THE INVENTION

It is an object of the invention to eliminate the above disadvantages of the prior art by providing a film end detector for use in automatic film winding camera which is highly durable and can be reduced in size without causing any likelihood of a malfunction.

In accordance with the invention, an angular position detector comprises a photoelectric detector which eliminates the need for mechanical contacts. This permits the durability to be improved and the size to be reduced. Since the detection of the film end occurs while a motor drive signal persists, no malfunction is caused, thus permitting an accurate detection of a film end.

DESCRIPTION OF PREFERRED EMBODIMENT

Figure 1:
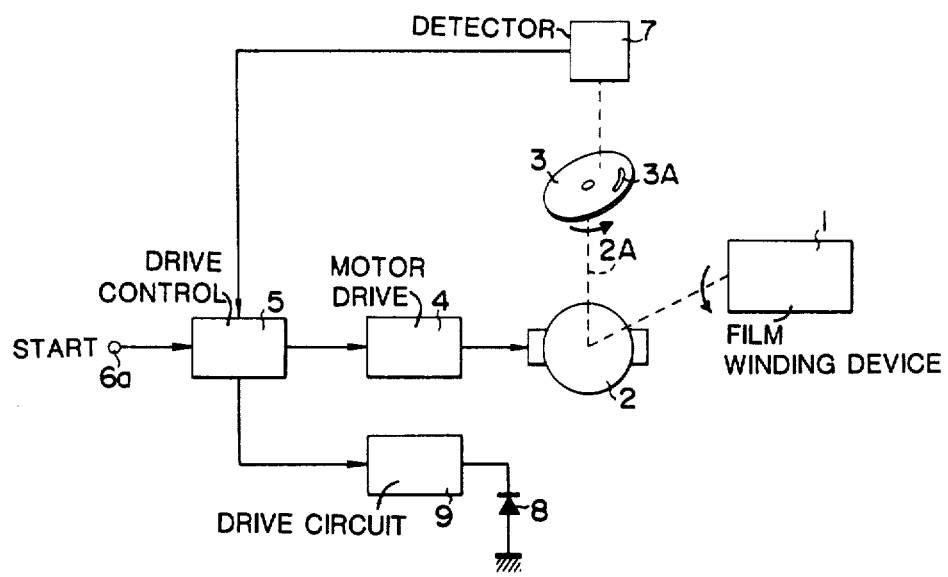
FIG. 1 is a schematic block diagram of a film end detector for use in automatic film winding camera which is constructed according to one embodiment of the invention.

Referring to FIG. 1, there is shown a film winding mechanism 1 which is connected with a motor 2. The motor 2 includes a drive shaft 2A on which a disc 3 having a light transmitting area 3A is fixedly mounted. It should be understood that a length of the film corresponding to one frame is wound up by the rotation of the motor drive shaft 2A through one revolution. The motor 2 is connected to a motor drive circuit 4, which is in turn connected to a drive control circuit 5. The drive control circuit 5 includes an input terminal 6a, to which a start signal is supplied. In response to the start signal, the control circuit 5 operates the motor drive circuit 4 to energize the motor 2 for a given time interval. An output signal of a photoelectric detector 7 which indicates the angular position of the drive shaft 2A or of the disc 3 is fed to an input terminal 6b (see FIG. 3) of the drive control circuit 5.

Figure 2A:
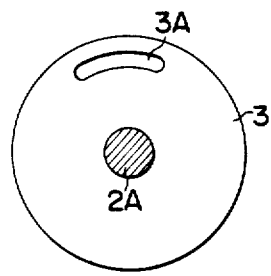
FIG. 2A is a front view of a rotary disc used in the detector of FIG. 1.
Figure 2B:
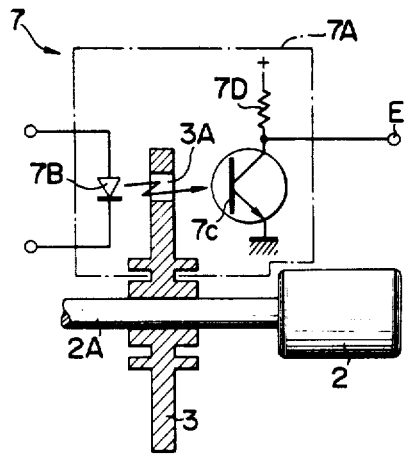
FIG. 2B is an enlarged view of part of the detector shown in FIG. 1.

FIG. 2A is a front view of the rotary disc 3, which is constructed to shield light except for a light transmitting area 3A of an arcuate form. As shown in FIG. 2B, the rotary disc 3 is coaxially and fixedly mounted on the drive shaft 2A of the motor 2. The photoelectric detector 7 includes a light source 7B such as a light emitting diode, tungsten lamp, neon lamp or the like, and a light receiving, photoelectric transducer element 7C, such as a phototransistor, CdS cell, photovoltaic element or the like, both of which elements 7B, 7C are disposed in opposing relationship with each other so that a path of light therebetween is in alignment with a path of rotation of the rotary disc 3. When a phototransistor is used as the transducer element 7C, its collector is connected through a load resistor 7D to a power supply while its emitter is connected to electrical ground.

As shown in FIG. 1, the drive control circuit 5 is connected to a drive circuit 9 associated with a warning display element 8 which may comprise a light emitting diode. When the warning element 8 is lit, an indication is given to a user that the film end is reached.

Figure 3:
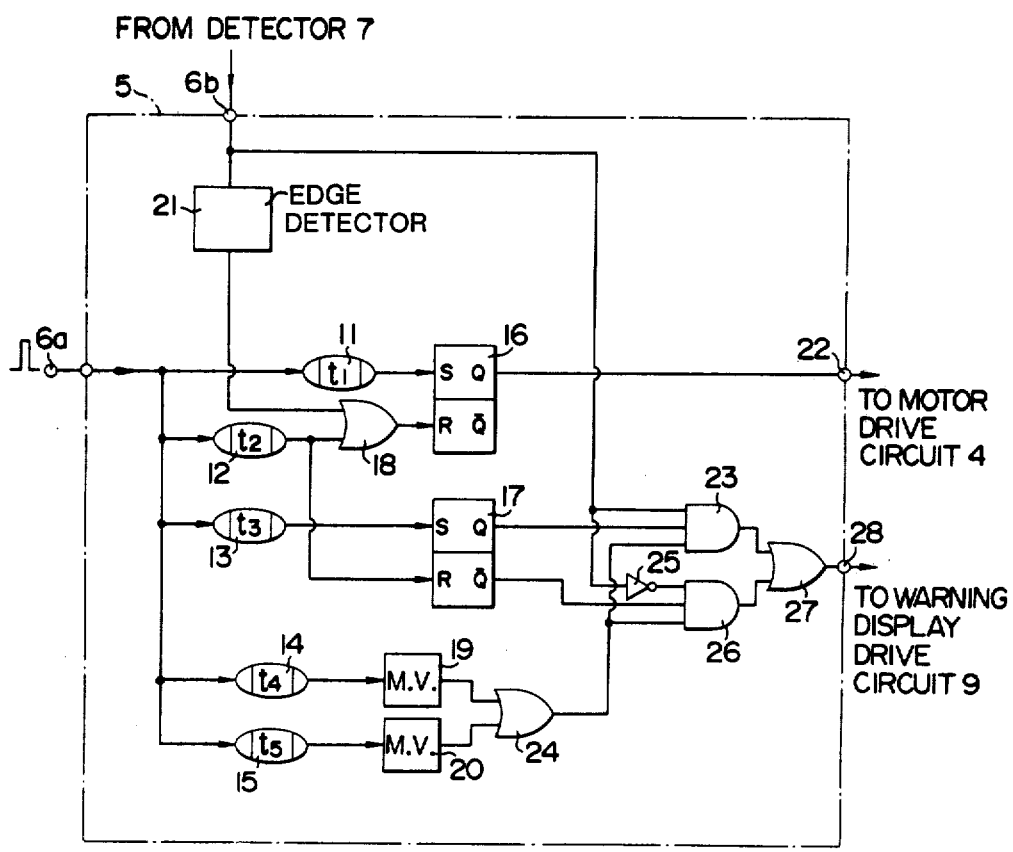
FIG. 3 is a circuit diagram of one form of a control circuit used in the detector of FIG. 1.

FIG. 3 is a circuit diagram of one form of the drive control circuit 5. In the control circuit 5 shown, the start signal supplied to the input terminal 6a is simultaneously supplied to five delay circuits 11, 12, 13, 14, 15 each having a time delay of $t_1$, $t_2$, $t_3$, $t_4$, $t_5$, respectively. The output of the first delay circuit 11 is applied to the set input of a flip-flop 16, the output of the second delay circuit $t_2$ is applied to one input of OR gate 18 and to the reset input of a flip-flop 17, the output of the delay circuit 13 is applied to the set input of the flip-flop 17, and the outputs of the delay circuits 14, 15 are applied to the input terminal of one-shot multivibrators 19, 20, respectively. The other input of OR gate 18 receives an output signal from an edge detector 21 which detects the falling edge of a signal supplied from the angular position detector 7. The output of OR gate 18 is supplied to the reset input of the flip-flop 16. The output signal at the Q output of the flip-flop 16 represents a motor drive signal, which is fed through an output terminal 22 to the motor drive circuit 4. The output signal at the Q output of the flip-flop 17 is supplied to one of the three inputs of AND gate 23. The output signals from the one-shot multivibrators 19, 20 are supplied to OR gate 24, the output of which is in turn supplied to another input of AND gate 23 and is also supplied to one of the three inputs of AND gate 26. A signal from the angular position detector 7 is supplied to the remaining input of AND gate 23, and is also supplied to another input of AND gate 26 through an inverter 25. The remaining input of AND gate 26 receives the output signal at the Q output of flip-flop 17. Each output signal from the AND gates 23, 26 is fed to OR gate 27, the output signal of which is fed through an output terminal 28 to the warning display drive circuit 9.

The operation of the film end detector thus constructed will now be described with reference to a series of waveforms illustrated in FIG. 4.

(1) Initially it is assumed that a sufficient length of the film is still available, and hence a normal film winding operation is possible. Signal SA shown in FIG. 4 represents a start signal supplied to the input terminal 6a, and is developed in response to an operation of a film winding member, not shown. At time TA when the start signal SA is produced, the light transmitting area 3A of the rotary disc 3 is located in the path of light from the light source 7B of the detector 7. When the start signal SA is produced, the flip-flop 16 is set after the time delay $t_1$ of the first delay circuit 11. Its Q output signal or motor drive signal assumes an H level to energize the motor drive circuit 4, thus energizing the motor 2. Signal SB shown in FIG. 4 represents the motor drive signal or the Q output signal from the flip-flop 16. When the motor 2 is energized, it rotates through one revolution, causing the film winding mechanism 1 to wind up one frame of the film. After the disc 3 has rotated through substantially one revolution, the light transmitting area 3A returns to the path of light of the angular position detector 7, whereby an angular position detection signal indicated by signal SC shown in FIG. 4 reverts to an L level at time TB. The falling edge of the detection signal SC is detected by the edge detector 21, with a detection pulse signal being fed to OR gate 18 and thence applied to the reset input of the flip-flop 16. As a result, the output signal at the Q output of the flip-flop 16 reverts to its L level, terminating the motor drive signal SB.

Figure 4:
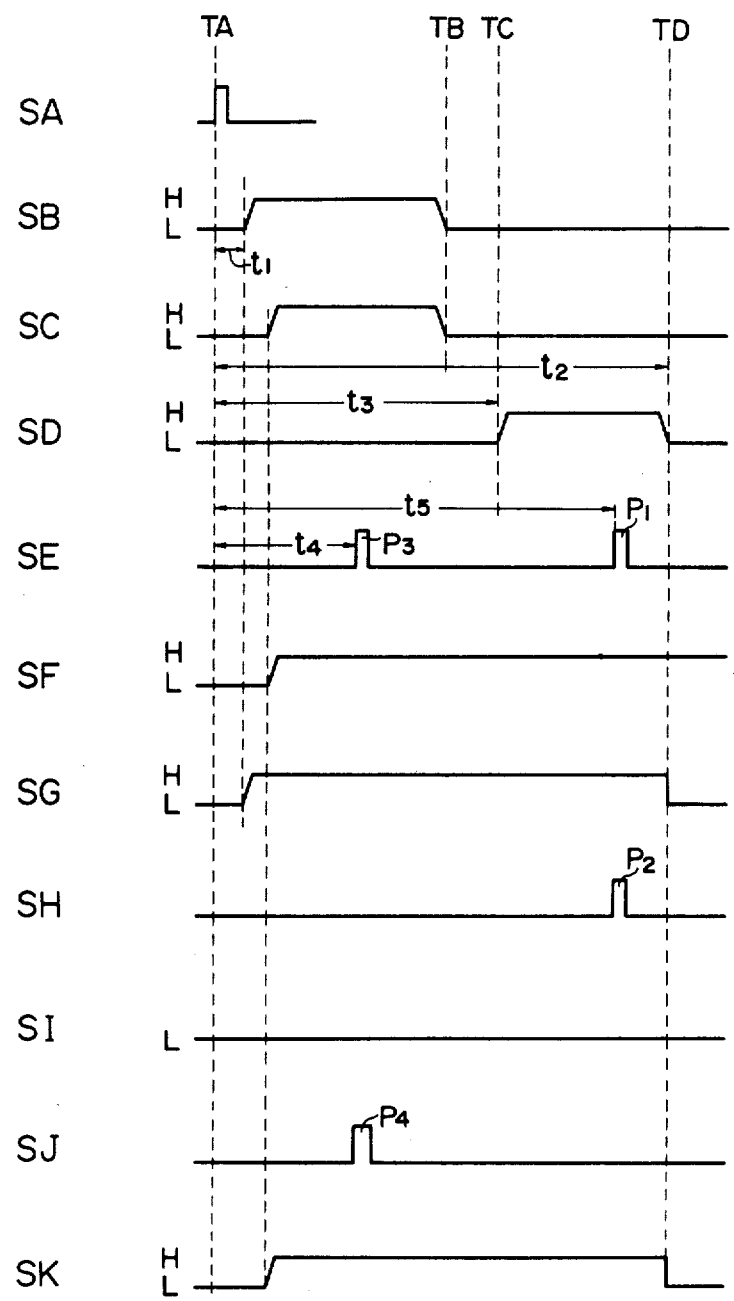
FIG. 4 graphically shows a series of waveforms representing signals appearing at various points in the electrical circuit of FIG. 3.

At time TC which is the time delay $t_3$ (which is chosen to be slightly greater than the time interval required for the motor 2 to rotate through one revolution) after the occurrence of the start signal SA, the flip-flop 17 is set, with its Q output signal or detection gate signal assuming an H level as indicated by signal SD shown in FIG. 4. The detection gate signal SD is applied to AND gate 23. A pulse signal $P_1$ of an H level is applied to AND gate 23 from the one-shot multivibrator 20 after the delay time $t_5$ from the time of occurrence TA of the start signal SA, as indicated by signal SE shown in FIG. 4. However, the angular position detection signal indicated by the signal SC of FIG. 4 assumes an L level at this time, so that the output of AND gate 23 remains at its L level, whereby no signal is supplied to the warning display drive circuit 9.

(2) A normal detection of a film end will now be described. In such situation, the motor 2 cannot rotate through one revolution. Consequently, the angular position detection signal cannot revert to its L level, but remains at its H level at time TB, as indicated by signal SF shown in FIG. 4. The motor drive signal is not terminated at time TB, as indicated by signal SG shown in FIG. 4. However, the signal SG is terminated at time TD as a result of the flip-flop 16 being forceably reset in response to a signal supplied from the second delay circuit 12 at the time delay $t_2$ after the occurrence of the start signal SA. In this manner, damage to the automatic film winding device is prevented. In response to the pulse signal $P_1$ produced by the one-shot multivibrator 20 at a point between times TC and TD, as indicated by signal SE in FIG. 4, the output of AND gate 23 changes to its H level, whereby a pulse signal $P_2$, indicated by signal SH shown in FIG. 4, is supplied to the warning display drive circuit 9. The drive circuit 9 may comprise a flip-flop, for example, which is set by the pulse signal $P_2$ to maintain the warning display element 8 illuminated.

(3) A situation will now be considered in which the film has been precisely exhausted during a previous photographing operation and no film winding operation takes place in response to the start signal SA. In this instance, the angular position detection signal remains at its L level, as indicated by signal SI shown in FIG. 4, and is applied to AND gate 26 through the inverter 25. On the other hand, a pulse signal $P_3$ is produced by the one-shot multivibrator 19 at the time delay $t_4$ after the occurrence of the start signal SA, as indicated by signal SE of FIG. 4, and is also applied to AND gate 26. Since the Q output signal from the flip-flop 17 which remains reset until time TC has been applied to AND gate 26, the latter produces a pulse signal $P_4$, indicated by signal SJ of FIG. 4, which operates the warning display drive circuit 9. In this instance, the motor drive signal will be the same as the signal SG shown in FIG. 4, and will be terminated at time TD.

(4) Finally, a situation will be considered in which a very small length of the film is left available so that the rotary disc 3 has rotated such that the light transmitting area 3A is slightly offset out of the path of light. As mentioned previously, there as been the likelihood of a malfunction in such instance. The angular position detection signal assumes its H level as indicated by signal SK in FIG. 4, and does not revert to its L level after time TB. Consequently, when the pulse signal $P_1$, indicated by the signal SE of FIG. 4, is produced at the time delay $t_5$ after the occurrence of the start signal SA, AND gate 23 produces the pulse signal $P_2$, indicated by the signal SH in FIG. 4, thus operating the warning display drive circuit 9. Although the detection signal from the angular position detector 7 will shift from its H to its L level, as indicated by signal SK in FIG. 4, as a result of a small rotation of the rotary disc 3 in the opposite direction when the motor drive signal, indicated by signal SG in FIG. 4, is terminated at time TD, it will be appreciated that no malfunction is caused thereby since the warning display drive circuit 9 has been already operated by time TD in the manner mentioned above. Stated differently, the film end is detected during a time interval from time TB when the rotary disc 3 has completed its rotation through one revolution until time TD corresponding to the termination of the motor drive signal when the film end is reached, so that the likelihood of causing a malfunction is avoided.

It should be understood that the invention is not limited to the particular embodiment described above, but that a number of modifications and changes are possible therein. In particular, the drive control circuit 5 is not limited to the specific form shown in FIG. 3, but may be constructed in a variety of different forms.

What is claimed is:

1. A film end detector for use in an automatic film winding camera comprising:
   a motor for automatically winding up a film;
   a film winding mechanism connected to the drive shaft of the motor for performing a film winding operation;
   a photoelectric detector for optically monitoring the rotation of the motor to produce a first signal indicative of the fact that the operation of the motor is in the course of a film winding operation and a second signal indicative of completion of a film winding by an amount corresponding to one frame; and
   a motor drive control circuit for producing a detection gate signal after the completion of an interval required for a normal film winding by one frame which occurs in response to the drive by the motor and prior to a subsequent automatic film winding operation and for producing a signal representing a logical product of the detection gate signal during and the first signal.

2. A film end detector according to claim 1 in which the photoelectric detector comprises a light source and a light receiving, photoelectric transducer element disposed in opposing relationship with respect to each other on the opposite sides of a rotary disc having a light transmitting area and mounted on the drive shaft of the film winding motor, the light source and the transducer element being disposed on a path of movement of the light transmitting area.

3. A film end detector according to claim 1 in which the motor drive control circuit comprises a first to a fifth delay circuit which produces respective output signals at time delays of $t_1$, $t_2$, $t_3$, $t_4$, $t_5$ after they have received a start signal indicative of the initiation of a film winding operation, an edge detector for detecting the falling edge of the output signal from the photoelectric detector, a first OR circuit for producing a logical sum signal of the output signal from the edge detector and the output signal from the second delay circuit, a first flipflop which is adapted to be set by the output signal from the first delay circuit and reset by the output signal from the first OR circuit, a second flipflop adapted to be set by the output signal from the third delay circuit and reset by the output signal from the second delay circuit, a first monostable multivibrator triggered by the output from the fourth delay circuit, a second monostable multivibrator triggered by the output from the fifth delay circuit, an inverter for inverting the output signal from the detector, a second OR circuit for producing a logical sum signal of the output signals from the first and the second monostable multivibrator, a first AND gate for producing a logical product signal of the output signal from the detector, the Q output signal from the first flipflop and the output signal of the second OR circuit, a second AND gate for producing a logical product signal of the output signal from the inverter, the Q output signal from the second flipflop and the output signal of the second OR circuit, and a third OR circuit for producing a logical sum signal of the output signals from the first and the second AND gate.

4. A film end detector for use in a camera comprising:
   a motor;
   a film winding mechanism responsive to said motor for performing a film winding operation;
   electronic detector means responsive to operation of the motor to produce a first signal indicating that a film-winding operation is in progress and a second signal indicating completion of a film-winding operation;
   control means for producing a detection gate signal after the time interval normally required to wind one frame of the film;
   said control means further including means responsive to coincident receipt of said gate detection signal and said first signal for generating a signal to indicate a warning condition.

5. A film end detector according to claim 4 wherein said control means further comprises motor control means responsive to a film-winding request for energizing said motor and responsive to movement of the film-winding mechanism sufficient to advance one frame of the film for deenergizing said motor.

6. A film end detector according to claim 5 including time delay means responsive to said film winding request to cause said motor control means to deenergize said motor a predetermined time after the time normally required to advance the film through one frame.

7. A film end detector according to claim 4 further comprising delay means responsive to a film-winding request for generating a delayed signal before termination of the time interval normally required to advance the film one frame;
   means responsive to the lack of movement of the film-winding mechanism when said delayed signal is present for generating an output signal.

8. A film end detector according to claim 4 further comprising:
   delay means for generating a delayed signal which occurs after the interval normally required to wind one frame of film is terminated; and
   said control means further including means responsive to a halt in the movement of the film winding means during the occurrence of said delayed signal for generating an output signal.

9. A film end detector for use in a camera, comprising:
   a motor:
   a film winding mechanism responsive to said motor for performing a film winding operation;
   electronic detector means responsive to operation of said motor to produce a first signal indicating that a film winding operation is in progress and a second signal indicating completion of a film-winding operation;
   control means for producing a detection gate signal within the time interval normally required to wind one frame of the film; and
   said control means further including means responsive to coincident receipt of said detection gate signal and said second signal for generating an output signal to indicate a warning condition.

* * * * *